(12) United States Patent
Goeser

(10) Patent No.: US 6,523,031 B1
(45) Date of Patent: Feb. 18, 2003

(54) METHOD FOR OBTAINING STRUCTURED INFORMATION EXISTS IN SPECIAL DATA FORMAT FROM A NATURAL LANGUAGE TEXT BY AGGREGATION

(75) Inventor: Sebastian Goeser, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,758

(22) Filed: Aug. 28, 1998

(30) Foreign Application Priority Data

Nov. 21, 1997 (DE) .......................... 197 51 518

(51) Int. Cl.$^7$ .............................. G06F 17/30
(52) U.S. Cl. ................ 707/6; 707/5; 707/536; 704/2; 704/9; 704/257; 706/26; 706/47; 706/48
(58) Field of Search ............... 707/1–10, 100–104, 707/200–206, 500, 512–515, 532, 536, 541; 704/1–10, 200, 221–222, 235, 257, 2, 9, 243; 706/26, 45, 55, 47–48

(56) References Cited

U.S. PATENT DOCUMENTS

| | | | | |
|---|---|---|---|---|
| 5,349,526 A | * | 9/1994 | Potts, Sr. et al. | 704/9 |
| 5,450,598 A | * | 9/1995 | Kaplan et al. | 707/533 |
| 5,477,451 A | * | 12/1995 | Brown et al. | 704/9 |
| 5,488,719 A | * | 1/1996 | Kaplan et al. | 707/100 |
| 5,548,719 A | * | 8/1996 | Kaplan et al. | 714/39 |
| 5,737,621 A | * | 4/1998 | Kaplan et al. | 707/531 |
| 5,970,449 A | * | 10/1999 | Alleva et al. | 704/235 |
| 6,016,467 A | * | 1/2000 | Newsted et al. | 704/9 |

* cited by examiner

Primary Examiner—Srirama Channavajjala
(74) Attorney, Agent, or Firm—P. Otterstedt

(57) ABSTRACT

A method for obtaining structured information from a natural language text by aggregation. The aggregation includes steps of reading in a natural language text, recognizing sentences and sentence constituents for the text read in in accordance with an extractor, which allocates an information-bearing structure to each sentence or sentence constituent, allocating a substitution symbol to one or more sentences or sentence constituents, introducing the results into a further information-bearing structure which comprises functors and argument terms and is described by a grammar.

13 Claims, 5 Drawing Sheets

METHOD FOR OBTAINING STRUCTURED INFORMATION EXISTS IN SPECIAL DATA FORMAT FROM A NATURAL LANGUAGE TEXT BY AGGREGATION

FIELD OF THE INVENTION

The present invention describes a method and system for obtaining structured information from natural language texts.

BACKGROUND OF THE INVENTION

Natural language texts in this connection are written expressions in a natural language, e.g. German, English, French, etc., which have a meaningful content for a language-competent reader. Structured information is relevant data, which exist in a special data format for processing in a data-processing system, e.g. tables of a relational database system or record structures of a classical programming language.

Such methods can be employed in order to convert all data processing systems, using such structured methods, to work directly on natural language texts. At present, for example, relevant data from appeal briefs are read by experts and compared with existing information sources, e.g. information stored in databases. This process is time-consuming and labour intensive.

Technical methods for solving these problems comprise scanning in the appeal briefs and presenting them on a screen of an editing tool to an expert for structure marking.

U.S. Pat. No. 5,450,598 describes a tool for generating an automatic device with infinite conditions where the data transfer is effected without the use of pointer variables. This process relates to the binary decision of the membership of a given natural language character string to the final device. It does not, however, permit structured information in the above mentioned sense to be allocated under all conditions of the end device.

The object of the present invention is to provide a system and method which enables natural language input data to be allocated structured data at high processing speeds.

BRIEF DESCRIPTION OF THE INVENTION

In accordance with the present invention, a method is provided for obtaining structured information from a natural language text by aggregation. The aggregation comprises the steps of reading in a natural language text, recognising sentences and sentence constituents of the text using an extractor, which allocates an information-bearing structure to each sentence or sentence constituent, allocating a substitution symbol to one or more sentences or sentence constituents, introducing the results into a further information-bearing structure which comprises functors and argument terms and is described by a grammar.

Advantages of the present invention reside in the fact that texts are analyzed with a high processing speed and so, called aggregations can simultaneously be recognized and represented. These aggregations may, in part, be predetermined by the user. This permits matching to specific user requirements. At the same time, improving the precision of the assignment of the structured information.

BRIEF DESCRIPTION OF THE DRAWINGS

The present invention will be illustrated in more detail by means of an example of a preferred embodiment, where.

DETAILED DESCRIPTION

Figure 1:
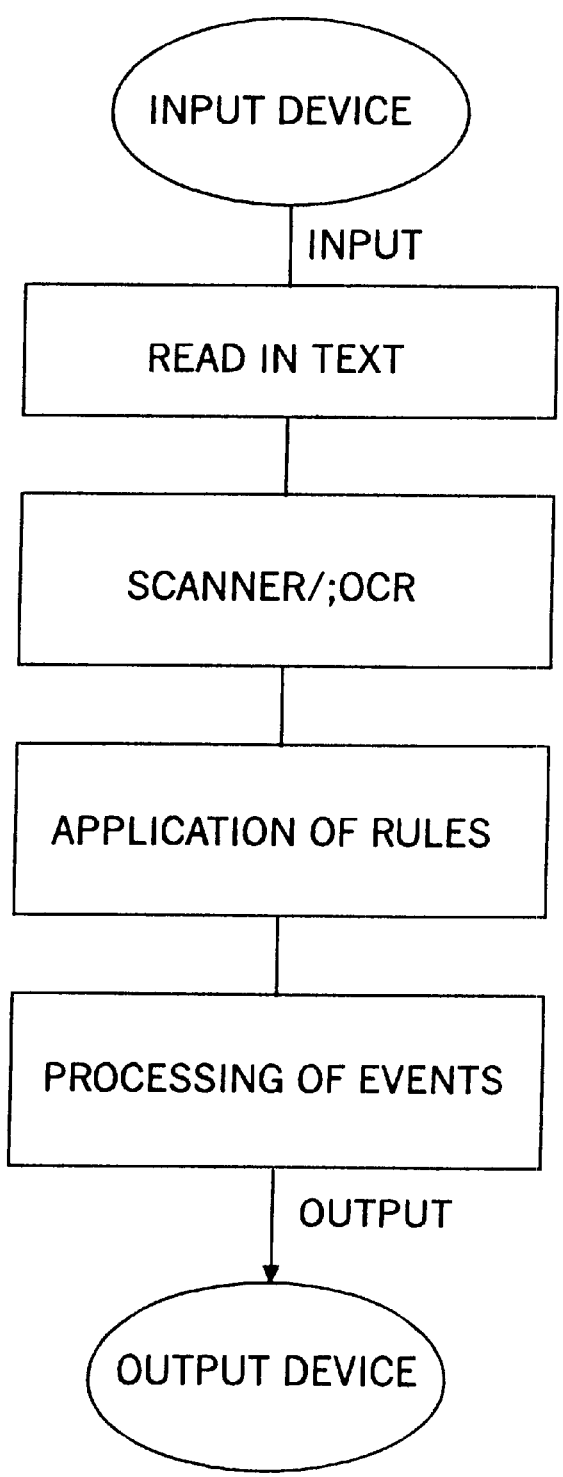
FIG. 1 shows a flow diagram of the individual steps of the process of the inventive aggregation in obtaining structured information from natural language texts.

FIG. 1 describes the individual process steps of the present invention in the form of a flow diagram. In step 1 the text to be processed (e.g. letter of complaint) is read in. In step 2 sentences or parts of sentences are recognised through the use of a finite automaton or other lower value extractor and an atomic information structure allocated to them. For this, the sentence or sentence component is represented by a substitute symbol. Such a recognised sentence or sentence component together with an atomic information structure is described as an aggregation. As an example, the name of the complainant or the relevant product to which the complaint refers could serve as an aggregation. For characterising aggregations, sample recognition and static methods can be used. In step 3 (application of rules) the information from step 2 and if relevant from other linguistic resources are combined to complex information-carrying structures (events) by the application of rules. In step 4 (processing of events) quantities of such information-carrying structures (events) are compared with one another so that classes of similar types of events can be formed. For example, the class of all such structures of personal names can be formed which describe the same person.

The event classes formed in this or similar ways are issued to the controlling application (e.g. a program for database construction) for further processing.

Figure 2A:
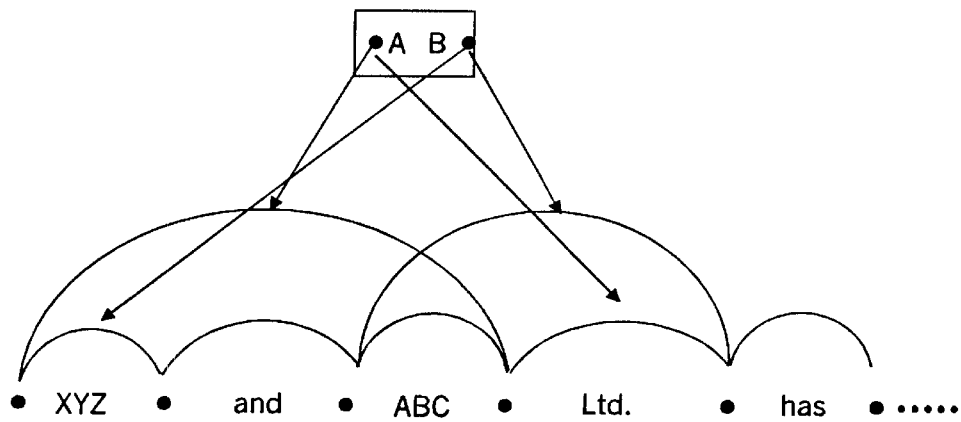
FIG. 2A shows the problem of ambiguity in constructing an information carrying structure in accordance with the conventional method using a sample sentence.

FIG. 2A describes the problem of ambiguity in constructing information-carrying structures (events) by means of conventional extraction methods. Using the example of a company name, two types of reading A and B are produced for the analysis of the company names @XYZ and ABC Ltd@, as represented by the following bracketed readings:

Reading A: (XYZ and ABC) (Ltd)

Reading B: (XYZ) and (ABC Ltd)

Since these readings have to be further processed in further analysis of the text and this analysis itself contains ambiguities, this gives rise to an exponential growth in processing time. As a consequence, the use of this type of extraction method is limited to small amounts of text.

Figure 2B:
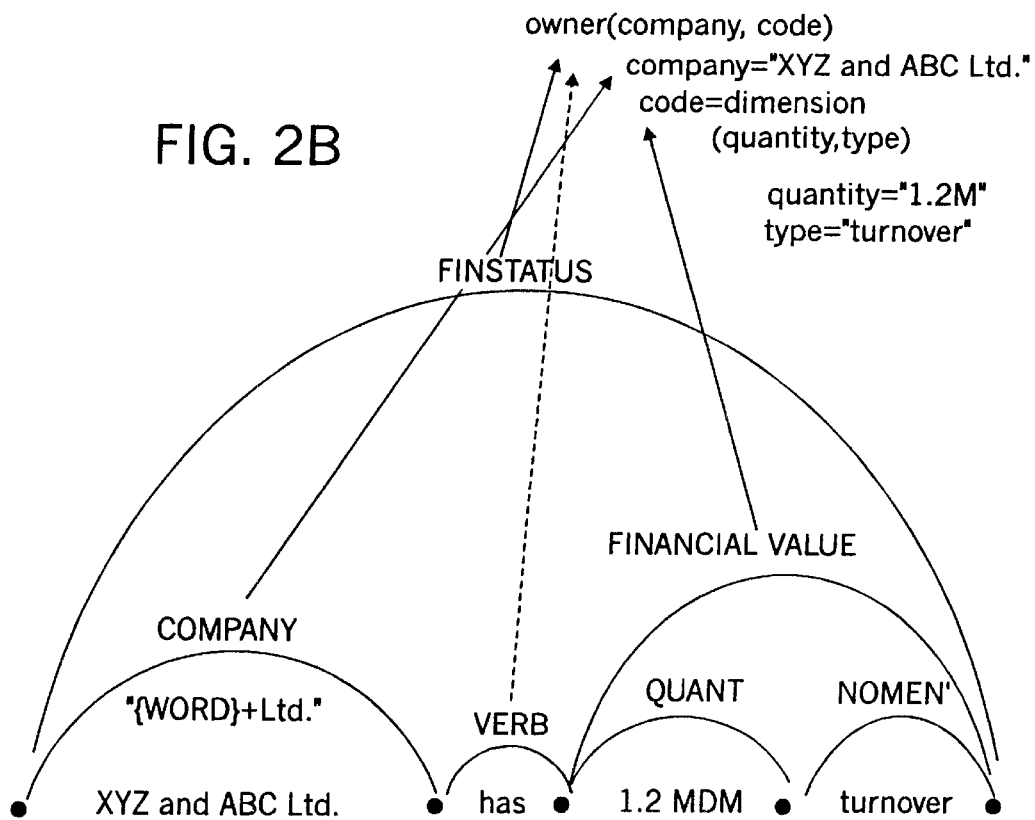
FIG. 2B shows the aggregation in accordance with the invention using the sample sentence in accordance with FIG. 2A in building an information carrying structure.

In FIG. 2B the construction of an information-carrying structure (event) by the aggregation method is explained.

By aggregation is to be understood the combining of textual information under a symbolic name, so that reference may be had to the aggregation from higher value information structures.

For this, the aggregation is considered as a semantic concept. The construction of an information-carrying structure by means of aggregation in accordance with the present invention is explained in more detail by means of the following example sentence.

Example sentence:

@XYZ and ABC Ltd. had DM1.2 million turnover in 1996@

In accordance with the invention the expression @XYZ and ABC Ltd.@ is represented by a finite automaton (FA). Likewise, the expression @DM1.2 million@ is represented by a (another) FA. The recognised individual FAs enter into the structure recognition together with additional atomic information. Each individual FA will be represented by a substitution symbol, for example the symbol @COMPANY_NAME@ in FIG. 2B, so that a substitution rule can have reference to the FA through this symbol. Furthermore, each FA has a semantic concept attached to it, for example the concept @COMPANY_NAME(character string)@, or @QUANTITY(number, unit)@, which is built into the event structure allocated to the example sentence. Aggregation ensures that the ambiguity (see FIG. 2A) relating to the analysis of atomic information structures is considerably reduced and consequently high rates of analysis can be achieved.

Figure 3:
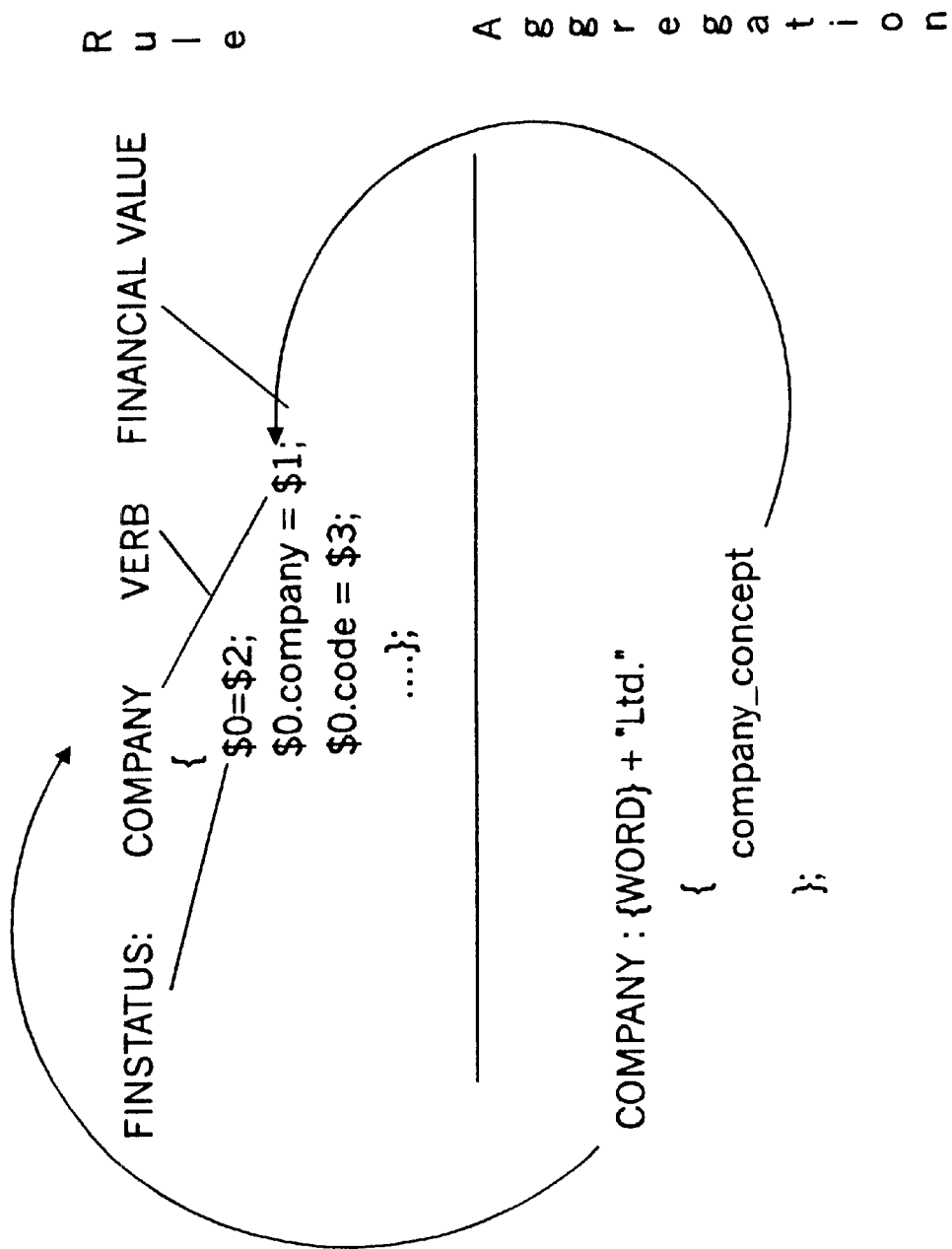
FIG. 3 shows a formal description of an extractor using the sample sentence in accordance with FIGS. 2A/B

FIG. 3—Formal Description of an Extractor

An extractor or information extractor is a program which breaks down natural language texts job-specifically to information carrying structures. For this, the breakdown is described by a number of rules, i.e. by a grammar. In accordance with known processes (annotated grammars) a rule consists of a substitution rule and a description, which this special substitution rule is allocated. In this description reference may be had to the information-carrying structure allocated to a symbol by the substitution rule. This applies in accordance with FIG. 1 both for step 2 (scanner/OCR) and for step 3 (application of rule), for which, however, in accordance with the invention, different formats of the substitution rules are used. While in applying the rules, context-free substitution rules are used, for the scanner and the OCR so-called regular expressions are employed. The reason for the use of regular expressions is that these can be compiled into highly efficient FAs. Regular expressions are, however, not powerful enough to completely describe all extractors.

FIG. 3 shows how, by means of an annotated grammar the aggregation of a company name is built into an event (information-carrying structure), where the event relates to the financial characteristics of the company.

For this reference is made to the regular expression of the aggregation with the substitution symbol @COMPANY_NAME@. The aggregation consists in the present case of one or more words followed by the string @Ltd@. At the same time in the associated description reference is made to the information structure allocated to the aggregation by means of the special variable $1.

Figure 4:
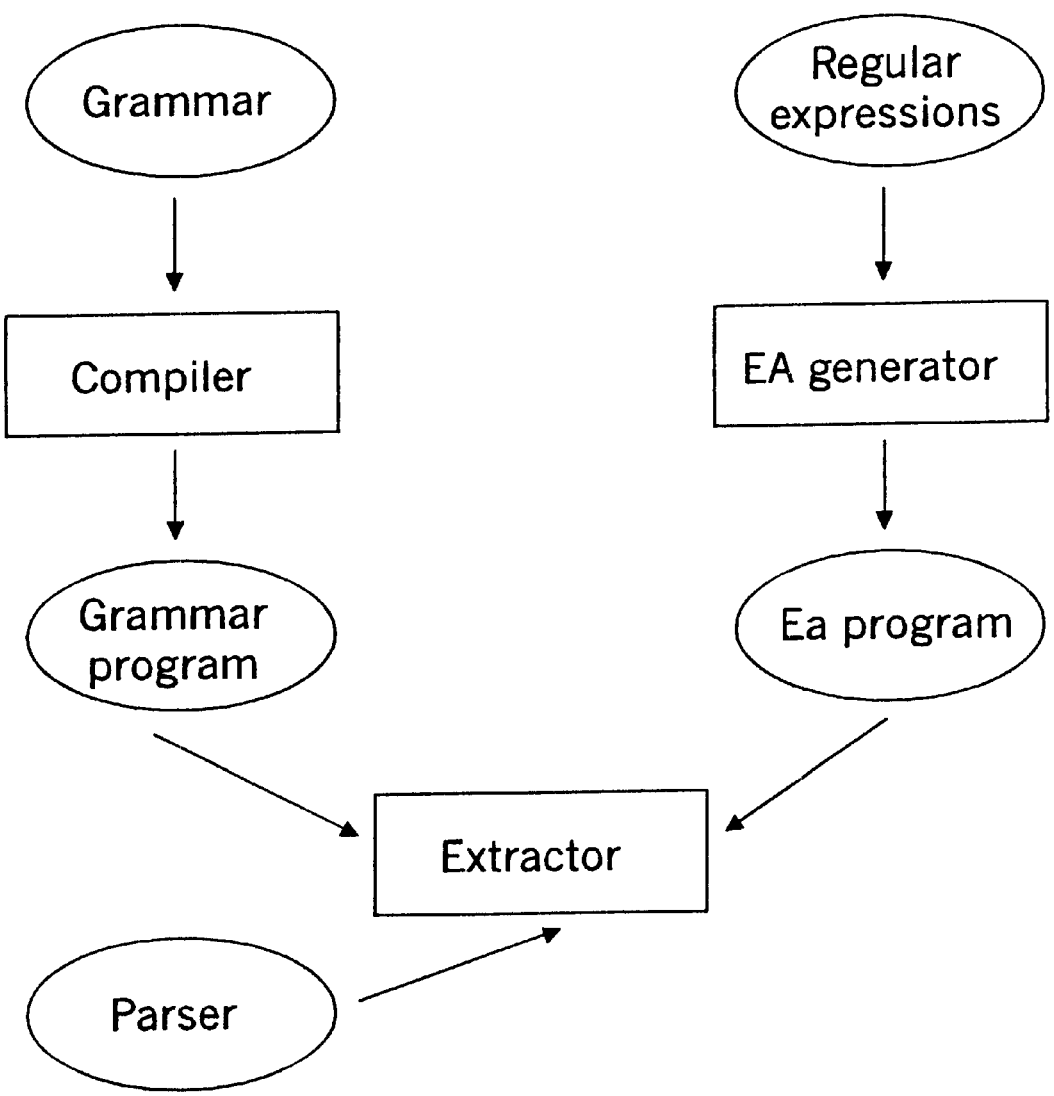
FIG. 4 shows the production of an extractor in accordance with the invention from the formal description in accordance with FIG. 3

FIG. 4 describes the production of an extractor from a formal description as shown in FIG. 3.

A grammar with annotations and a number of regular expressions, likewise with annotations (see FIG. 3) are given. These are translated by a compiler or by a so-called lexer into programs in a higher programming language (e.g. C). Together with additional software (parser) running the grammar, this forms an extraction code, which can then be translated into a machine program, the so-called extractor object.

Figure 5:
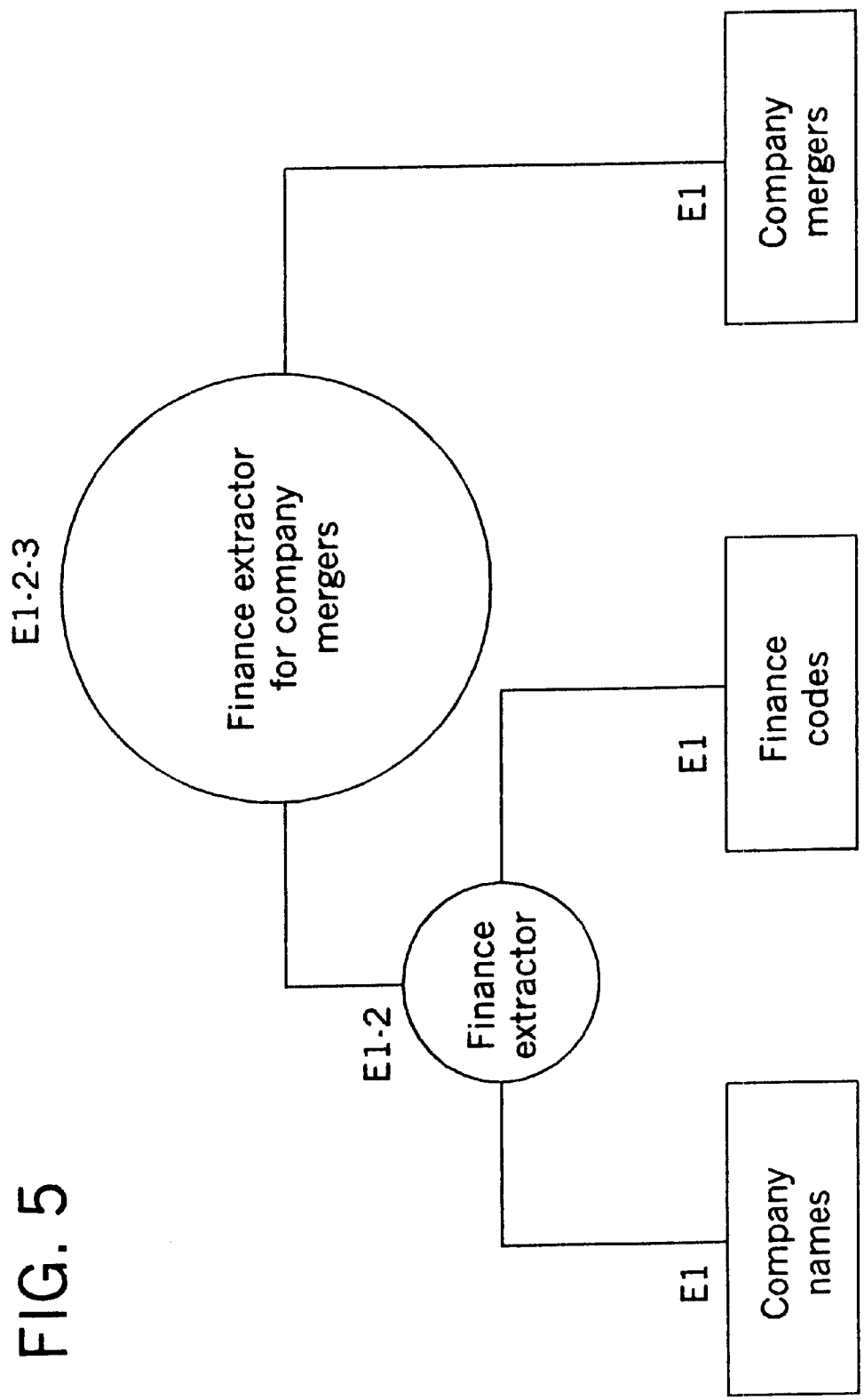
FIG. 5 shows the production of higher value extractors from lower value extractors based on the method in accordance with the description in FIG. 4.

FIG. 5. shows how higher value extractors can be produced from lower value extractors by aggregation.

In accordance with the invention several extractors can be combined in the manner described above. For this, there must be reference from the description allocated by a rule to an event structure. As shown in FIG. 5, a finance extractor (E1-2-3) can be produced for company mergers, by combining an extractor for financial features (E 1-2) with an extractor for company mergers (E 3). This aggregation is achieved by making reference in the rules for the higher extractors to event structures in the lower as in FIG. 3.

In summary, the present invention describes a method for obtaining structured information from a natural language text by aggregation, where the aggregation comprises the following steps:

a) reading in a natural language text b) recognising sentences and sentence constituents for the text read in, in accordance with step a) by using an extractor, which allocates an information-bearing structure to each sentence or sentence constituent c) allocating a substitute symbol to one or more sentences or sentence constituents d) introducing the results in accordance with steps b) and c) into a further information-bearing structure which comprises functors and argument terms and is described by a grammar.

e) Comparing the information-carrying structures and forming classes of information-carrying structures which describe the same object.

The above-mentioned method finds application particularly in database management systems.

The extractors can be specified through a number of regular expressions by the user.

The extractor is a finite automaton and can itself comprise an aggregation in accordance with step a).

The present invention further describes a method for the production of extractors for breaking down natural language texts into one or more information-carrying structures, comprising the following steps:

a) setting up a number of regular expressions where a description is allocated to each expression, where this description assigns an (atomic) information-bearing structure to each recognised character string, where the regular expression is represented by a substitute symbol, where the information-bearing structure corresponds to a semantic concept, where the character string comprises several words and where the information-bearing structure is of a type, so that reference may be made to it by means of a variable.

b) setting up a plurality of substitution rules for describing the structure of the information-bearing structures, where each such rule is assigned a description of the structure of the information-bearing structure assigned to it, where each terminal element of a substitution rule is a substitution symbol, in accordance with a), where reference is made in the descriptions to the information-bearing structures of subordinated elements by means of special variables and where such information-bearing structures, to which terminal elements are assigned, are atomic.

The translation of the extractor into machine code can be effected by the following steps:

c) generating a finite automaton in a platform-independent programming language from the results in accordance with step a)

d) compiling the results in accordance with step b) in a platform-independent programming language e) compiling the results in accordance with steps c) and d) and producing a runable program with the incorporation of a grammar interpreter.

Higher value extractors are produced by the following steps:

a) incorporating the low value extractor in accordance with the above-described method as scanner, so that substitution symbols for the low value extractor become the terminal substitution symbols for the higher value extractor b) referencing by means of variables the information-bearing structures of the low value extractor, so that these serve as atomic information-bearing structures for the higher value extractor.

What is claimed is:

1. A method for obtaining structured information which exists in a special data format for processing in a data processing system from a natural language text by aggregation, where the aggregation comprises the steps of:
   a) reading in a natural language text;
   b) recognizing sentences and sentence constituents in a natural language text for the text read in accordance with step a) by using an extractor, which allocates an information-bearing structure to each -sentence or sentence constituent of the natural language text;
   c) allocating a substitute symbol which is other than a part of speech label to one or more sentences or multiword sentence constituents of the special data format;
   d) introducing the results obtained in accordance with steps b) and the substitute symbols allocated in step c) into a further information-bearing structure which comprises functors and argument terms and is described by a computer readable grammar which contains special substitution rules for the substitute symbols added in step c.

2. The method of claim 1, characterized in that the information-bearing structure is entered into a data base with other information bearing structures.

3. The method of claim 2, characterised by an additional step of:
   e) comparing the information-bearing structures with one another and forming classes of information-bearing structures which describe the same object.

4. The method of claim 3, characterized in that the extractor can be specified by the end user by means of a number of regular expressions.

5. The method of claim 4, characterised in that the extractor is an infinite automat.

6. The method of claim 4, characterized in that the extractor in accordance with step b) itself involves an aggregation of at least two other extractors.

7. The method of claim 1, including translating the extractor into machine code by means of the steps of:
   g) generating an infinite automat in a platform-independent programming language from the results in accordance with step e);
   h) compiling the results in accordance with step f) in a platform-independent programming language;
   i) compiling the results in accordance with steps g) and h) and producing a runable program with the incorporation of a grammar interpreter.

8. The method from the results of the method in accordance with claim 1 including the steps of:
   j) incorporating a low quality extractor generated in accordance with steps e) and f) as scanner, so that substitution symbols for the low quality extractor becomes the terminal substitution symbols for the high quality extractor;
   k) notifying by means of variables the information-bearing structures of the low quality extractor, so that these serve as atomic information-bearing structures for the high quality extractor.

9. A method for the production of extractors for representing natural language texts in one or more information-bearing structures, comprising the steps of:
   a) setting up a:number of known, regular multiword expressions in a natural language where a description is allocated to each expression, where this description assigns an (atomic) information-bearing structure to each character string of recognized characters, where the regular multiword expressions are each represented in a further information bearing structure by a substitute symbol which is other than a part of speech label, where the further information-bearing structure corresponds to a semantic concept applicable to reduce ambiguity of the multiword expressions represented by the substitute symbol, where the character string comprises several known words and where the further information-bearing structure is of a type that reference may be made to by means of a variable;
   b) setting up a plurality of substitute rules for describing the structure of the further information-bearing structures, where each such rule is assigned a description of the structure of the information-bearing structure assigned to it, where each terminal element of a substitution rule is a substitution symbol, in accordance with a), where reference is made in the descriptions to the information-bearing structures of subordinated elements by means of special symbols and where such information-bearing structures, to which terminal elements are assigned, are atomic.

10. A method for the production of high quality extractors from the results of the method in accordance with claim 8 comprising the steps of:
    a) incorporating the low quality extractor in accordance with claim 8 as scanner, so that substitution symbols for the low quality extractor become the terminal substitution symbols for the high quality extractor;
    b) notifying by means of variables the information-bearing structures of the low quality extractor, so that these serve as atomic information-bearing structures for the high quality extractor.

11. The method of claim 9, characterised in that the extractor is also translatable into machine code by means of the additional steps of:
    c) generating an infinite automat in a platform-independent programming language from the results in accordance with step a)
    d) compiling the results in accordance with step b) in a platform-independent programming language
    e) compiling the results in accordance with steps c) and d) and producing a runable program with the incorporation of a grammar interpreter.

12. A method for obtaining structured information which exists in a special data format for processing in a data processing system from a natural language text by aggregation, where the aggregation comprises the steps of:
    a) reading in a natural language text;
    b) recognizing multiple word constituents in a natural language text made up of recognized characters for the text read in accordance with step a) by using an extractor, which allocates an information-bearing structure to each sentence or sentence constituent of the natural language text;
    c) allocating a substitute symbol, other than a part of speech label, to a multiword constituent of the special data format;
    d) combining the results obtained in step b) and the substitute symbol allocated in step c) into a further information-bearing structure which comprises functors and argument terms and is described by a computer readable grammar convertible to a higher level program language, which grammar contains special substitution rules related to the special data formats for the substitution symbol which rules are established by a user to reduce ambiguity.

13. The method of claim 12, wherein the language is C.

* * * * *